Aug. 3, 1937.    A. KRATKY    2,089,030
METHOD FOR THE PRODUCTION OF BODIES OF EXTREME HARDNESS
Filed April 6, 1934    2 Sheets-Sheet 1

INVENTOR
ANTON KRATKY
BY
Richards & Geier
ATTORNEYS

Aug. 3, 1937.  A. KRATKY  2,089,030
METHOD FOR THE PRODUCTION OF BODIES OF EXTREME HARDNESS
Filed April 6, 1934   2 Sheets-Sheet 2

INVENTOR
ANTON KRATKY
BY
Richards & Geier
ATTORNEYS

Patented Aug. 3, 1937

2,089,030

UNITED STATES PATENT OFFICE 2,089,030

METHOD FOR THE PRODUCTION OF BODIES OF EXTREME HARDNESS

Anton Kratky, Vienna, Austria

Application April 6, 1934, Serial No. 719,259
In Austria April 9, 1933

12 Claims. (Cl. 75—22)

This invention relates to a method for the production of hardened material, which is particularly in use for the manufacture of cutting tools and other working implements, that material being made of hard carbides, hard nitrides, and the like, which are formed into blanks under pressure, then heated to sintering temperature, and finally densified by means of high pressure and extreme heat. The method according to the invention consists essentially in carrying out the densification for instance by making use of carbon electrodes between which the shaped block of material is clamped and held a short distance above a matrix and a short distance below a hammer die which is held in position during the heating up to the required temperature, whereupon a powerful instantaneous blow is given to the hammer die, driving the highly heated block into the matrix and densifying it therein.

For the purpose of the invention there can be employed carbides, nitrides, silicides, borides, and the like, of refractory metals or metalloids, such as tungsten, uranium, molybdenum, titanium, boron, zirconium, thorium, and others, produced in any suitable way.

Figure 1:
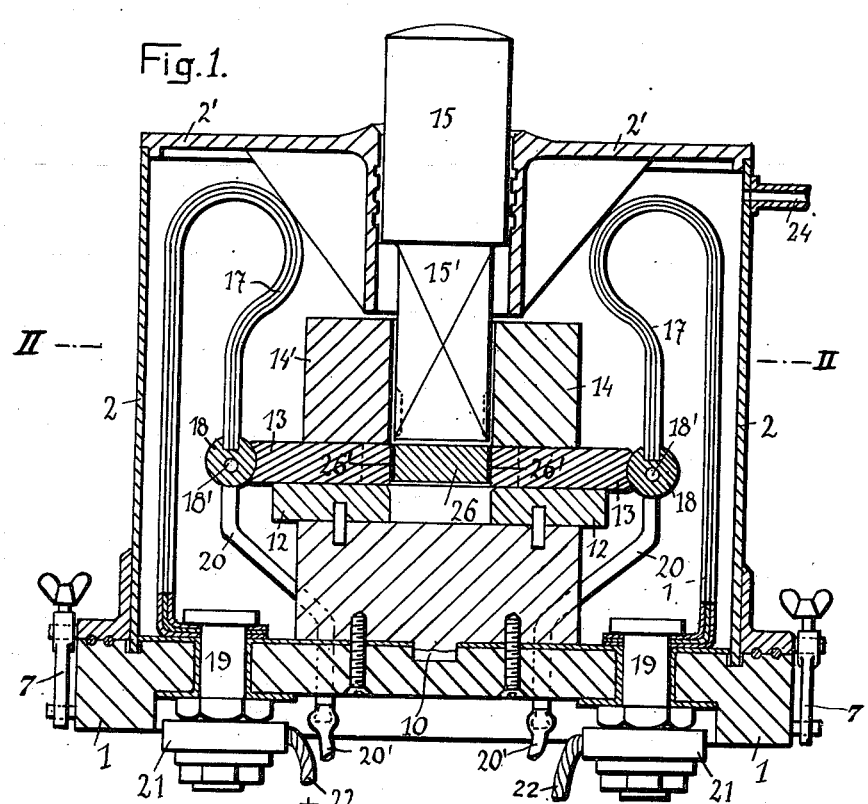
Figure 2:
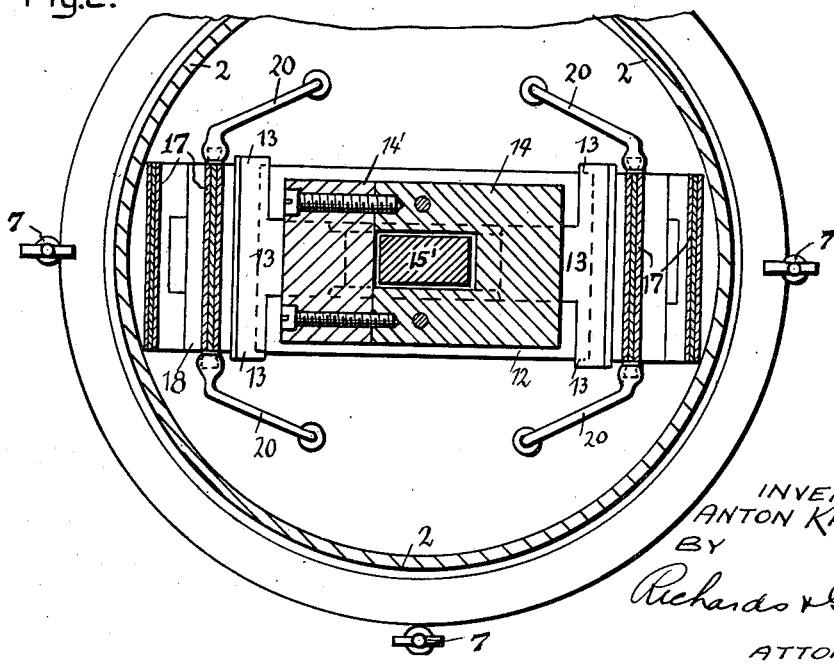
Figure 3:
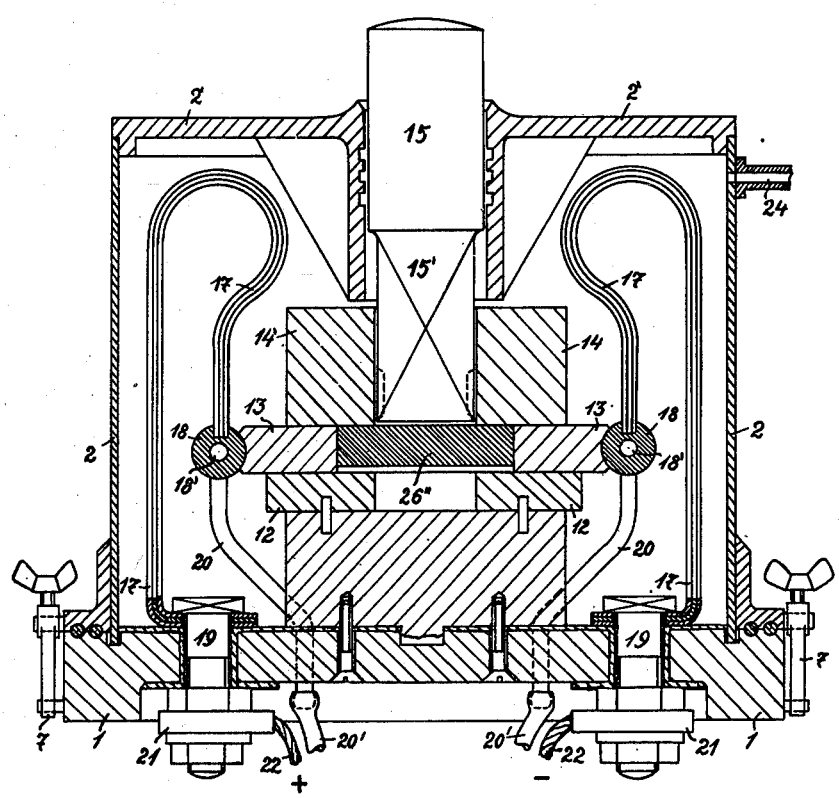

An example of an apparatus for carrying out the method according to the present invention is shown in the accompanying drawings in which Fig. 1 is a longitudinal section of the apparatus, while Fig. 2 is a cross section along line II—II of Fig. 1, and Fig. 3 is a particular embodiment of the apparatus according to Fig. 1 for another mode of carrying out the method according to the invention.

The apparatus shown in the drawings consists of a preferably iron base plate 1 upon which is placed a vacuum-tight bell jar 2 2' secured in position by means of screw clamps 7. The head 2' of the bell jar 2 is provided with a guide portion for the hammer die 15, the lower reduced portion 15' of which is guided between the blocks 14 14'.

The shaped block of hard material to be densified is numbered 26 and is held in position above the steel matrix 12 and closely below the face of the hammer die 15' by means of the electrodes 13 which are pressed against the block 26 by two leaf springs 17, the ends of which are provided with rollers 18, which press against the outer ends of the electrodes 13. Current for the heating of the shaped block 26 is supplied to the electrodes through the springs 17 which are connected to the cables 22 by means of screws 19 and clamps 21. The tube connection 24 serves for the evacuation of the bell jar since the heating and densifying is preferably carried out in an evacuated or partially evacuated state of the bell jar 2 (or in an atmosphere of inert gas). In order to prevent coalescence of the clamping electrodes (made of carbon, graphite or silicon, or high fusing metal such as tungsten) with the shaped block, at the high temperatures used, and the damaging of the clamping surfaces resulting from the delivery of the blow with the hammer die, thin sheets 26' 26' of metal or graphite are inserted between the block and the electrodes, or the block is thickly graphited or metallized on the outside. For the same purpose the block may be surrounded by a frame of very thin sheet metal for instance of nickel, iron, or the like. The block is then heated and pressed into the matrix together with this frame. In this manner the carbon electrodes are protected from injury and wear, and can be repeatedly used a large number of times without the necessity for touching up and readjusting. The shaped block made of pulverulent carbides or the like (nitrides, silicides, borides, etc.) could likewise be provided with a granular layer of pure metal (for instance iron powder) incorporated in the surfaces destined for contact with the clamping means, during the initial shaping and pressing process. This protective layer of metal should preferably protrude for about 1-2 mm. into the material of the block. Another way for serving the same purpose is to cool the electrodes of the apparatus described. To this end the electrode-contacting rollers 18 will have to be provided with holes 18' which are connected by pipe-lines 20' to a cooling-water-source. In this case it is preferred to use shaped blocks 26'' of the material to be treated which are up to a third longer than the depression of the matrix as shown in Fig. 3. With this arrangement too, the shaped block of hard material is interposed as a resistance in the current circuit. On being traversed by the electric current (of about 800 amperes and 4 volts) the middle portion of the block is heated up to white heat, while its end parts remain substantially cool in consequence of the action of the vigorously cooled clamping faces of the electrodes 13. The required welding temperature attained, the die is depressed instantaneously, for example by means of a powerful blow of a hammer tup, so that it drives only the middle portion of the block into the depression of the matrix and compresses that portion of the block to a high degree, while the outer ends of the block rest out of the matrix. By this arrangement and mode of operation the highly heated shaped block is also prevented from coalescing with the clamping faces of the electrodes, which remain clean and undamaged for a very long time. Experience has shown that for example carbon or metallic tungsten is an excellent material for the clamping electrodes.

The matrix disposed beneath the clamped shaped block may also be provided with a round depression coacting with a hammer die of round cross section for the purpose of producing a disc-shaped finished block from a blank of prismatic shape. The stamping out and compressing of the round disc is likewise effected in a single operation. It is, however, also possible to make disc-shaped presintered blanks, and to treat these in the same manner, by clamping between carbon cheeks, heating, and highly compressing by means of a hammer die. In order to prevent welding of the disc to the carbon cheeks in this case, the former is surrounded by a thin hoop, for example of sheet iron. The disc may also be totally enclosed into a thin capsule of sheet metal, or may be thickly graphited or metallized at the edges contacting with the clamping cheeks, or these edges could be made of impressed pure metal powder. The blanks may also be placed in the densifying plant in the non-sintered state, only in this case they must be particularly highly compressed and thoroughly dried beforehand.

What is claimed is:

1. A method of producing hard bodies from a finely powdered refractory material, by pressing the material to be treated to form a body, then heating same as a resistance between two clamping electrodes to hold the same a short distance above a matrix and a short distance below the face of a hammer die, and driving the body immediately upon reaching the required temperature away from the electrodes into the matrix by a powerful instantaneous blow onto the hammer die, thereby densifying it in the matrix.

2. A method of producing hard bodies from a finely powdered tungsten carbide, by pressing the tungsten carbide powder to be treated to form a body, then heating same as a resistance between two clamping electrodes to hold the same a short distance above a matrix and a short distance below the face of a hammer die, and driving the body immediately upon reaching the required temperature away from the electrodes into the matrix by a powerful instantaneous blow onto the hammer die, thereby densifying it in the matrix.

3. A method of producing hard bodies from a finely powdered tungsten carbide, by pressing the tungsten carbide powder to be treated to form a body, pre-sintering the said body, then heating same as a resistance between two clamping electrodes to hold the same a short distance above a matrix and a short distance below the face of a hammer die, and driving the body immediately upon reaching the required temperature away from the electrodes into the matrix by a powerful instantaneous blow onto the hammer die, thereby densifying it in the matrix.

4. A method of producing hard bodies from a finely powdered refractory material, by pressing the material to be treated to form a body of a length greater than that of the depression of the matrix, then clamping same between two electrodes which hold it a short distance above the matrix and a short distance below the face of a hammer die, cooling the clamping faces of the electrodes, heating the body, the ends of which are cooled as a result of the cooling of the electrodes, and driving the highly heated middle portion of the body immediately upon reaching the required temperature away from the electrodes by a powerful instantaneous blow upon the hammer die into the substantially cold matrix and densifying the middle portion of the body therein, while the substantially cool end portions of the body remain outside.

5. A method of producing hard bodies from a finely powered tungsten carbide, by pressing the tungsten carbide powder to be treated to form a body of a length greater than that of the depression of the matrix, pre-sintering the said body, then clamping same between two electrodes which hold it a short distance above the matrix and a short distance below the face of a hammer die, cooling the clamping-faces of the electrodes, heating the body, the ends of which are cooled as a result of the cooling of the electrodes, and driving the highly heated middle portion of the body immediately upon reaching the required temperature away from the electrodes by a powerful instantaneous blow upon the hammer die into the substantially cold matrix and densifying the middle portion of the body therein, while the substantially cool end portions of the body remain outside.

6. A method of producing hard bodies from a finely powdered refractory material, by pressing the material to be treated to form a body, arranging a layer of electro-conducting material such as metal on those faces of the body where it contacts clamping electrodes, which hold it between a hammer die and a matrix, heating the body up to the required temperature and densifying the same by driving it into the substantially cold matrix by a powerful instantaneous blow of the hammer die immediately upon reaching the required temperature.

7. A method of producing hard bodies from a finely powdered tungsten carbide, by pressing the tungsten carbide powder to be treated to form a body, pre-sintering the said body, arranging a layer of electro-conducting material such as metal on those faces of the body where it contacts clamping electrodes, which hold it between a hammer die and a matrix, heating the body up to the required temperature and densifying the same by driving it into the substantially cold matrix by a powerful instantaneous blow of the hammer die immediately upon reaching the required temperature.

8. A method of producing hard bodies from a finely powdered refractory material, by pressing the material to be treated to form a body, arranging thin metallic sheets on either face of the body contacting with clamping electrodes holding it between a hammer die and a matrix, heating the body up to the required temperature and densifying the same in the substantially cold matrix by a powerful instantaneous blow of the hammer die.

9. A method of producing hard bodies from a finely powdered tungsten carbide, by pressing the tungsten carbide powder to be treated to form a body, pre-sintering the said body, arranging thin metallic sheets on either face of the body contacting with clamping electrodes holding it between a hammer die and a matrix, heating the body up to the required temperature and densifying the same in the substantially cold matrix by a powerful instantaneous blow of the hammer die.

10. A method of producing hard bodies from a finely powdered refractory material, by pressing the material to be treated to form a body, incorporating a thin layer of metallic powder and graphite in the body, clamping same between electrodes holding it in the space between a hammer die and a matrix, heating the body up to the required temperature and densifying it in the substantially cold matrix by a powerful instantaneous blow of the hammer die.

11. A method of producing hard bodies from a finely powdered refractory material, by pressing the material to be treated to form a body, incorporating a thin layer of graphite in the body, clamping same between electrodes holding it in the space between a hammer die and a matrix, heating the body up to the required temperature and densifying it in the substantially cold matrix by a powerful instantaneous blow of the hammer die.

12. A method of producing hard bodies from a finely powdered tungsten carbide, by pressing the tungsten carbide powder to be treated to form a body, incorporating a thin layer of metallic powder and graphite in the body pre-sintering said body, clamping same between electrodes holding it in the space between a hammer die and a matrix, heating the body up to the required temperature and densifying it in the substantially cold matrix by a powerful instantaneous blow of the hammer die.

ANTON KRATKY.